United States Patent
Buck et al.

(10) Patent No.: US 8,869,953 B2
(45) Date of Patent: Oct. 28, 2014

(54) BRAKE DISC HAVING RIBS ARRANGED BETWEEN TWO FRICTION RINGS

(75) Inventors: Alexander Buck, Munich (DE); Stefan Mandlmeier, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 217 days.

(21) Appl. No.: 12/842,471

(22) Filed: Jul. 23, 2010

(65) Prior Publication Data

US 2010/0282552 A1     Nov. 11, 2010

Related U.S. Application Data

(63) Continuation of application No. PCT/EP2009/000965, filed on Feb. 12, 2009.

(30) Foreign Application Priority Data

Mar. 12, 2008  (DE) .......................... 10 2008 013 871

(51) Int. Cl.
*F16D 65/12* (2006.01)
*F16D 65/00* (2006.01)
*F16D 65/02* (2006.01)

(52) U.S. Cl.
CPC ........ *F16D 65/12* (2013.01); *F16D 2065/1328* (2013.01); *F16D 65/0006* (2013.01)
USPC .................................................. 188/218 XL

(58) Field of Classification Search
CPC ................ F16D 2065/1316; F16D 2065/1328; F16D 2065/1392; F16D 65/0006; F16D 65/128; F16D 65/12
USPC ........... 188/218 XL, 218 R, 218 A; 192/30 V, 192/107 R
See application file for complete search history.

(56) References Cited

U.S. PATENT DOCUMENTS 1,572,680 A * 2/1926 Price ......................... 188/206 R
3,366,202 A    1/1968 James
(Continued)

FOREIGN PATENT DOCUMENTS

DE    16 25 689 C2    12/1970
DE    19 40 669        2/1971
(Continued)

OTHER PUBLICATIONS

German Search Report dated Jan. 12, 2010 with partial English translation (nine (9) pages).

(Continued)

*Primary Examiner* — Bradley King
*Assistant Examiner* — Stephen Bowes
(74) *Attorney, Agent, or Firm* — Crowell & Moring LLP

(57) ABSTRACT

A brake disc is provided having ribs arranged between two friction rings, extending radially with side walls standing essentially perpendicular to the friction rings to bound air cooling ducts. At least one of the side walls of one, two, three, or five ribs is inclined with respect to the perpendicular ribs to avoid squealing noise. At least one of the ribs having at least one inclined side wall has a thickness measured in the direction perpendicular to the side wall which differs from the thickness of the perpendicular ribs. When two, three, or five ribs having inclined walls are present, the angles enclosed between these ribs preferably are not all the same. Any imbalance resulting from this non-uniform distribution of ribs having an inclined side wall is essentially eliminated by adding material on selected perpendicular ribs.

4 Claims, 4 Drawing Sheets

(56) References Cited

U.S. PATENT DOCUMENTS

| | | | |
|---|---|---|---|
| 4,523,666 A | 6/1985 | Murray | |
| 5,137,123 A * | 8/1992 | Setogawa et al. | 188/264 AA |
| 6,347,691 B1 | 2/2002 | Aydt | |
| 2002/0084155 A1 * | 7/2002 | Ballinger et al. | 188/218 XL |
| 2002/0084156 A1 | 7/2002 | Ballinger et al. | |

FOREIGN PATENT DOCUMENTS

| | | |
|---|---|---|
| DE | 195 37 392 A1 | 4/1997 |
| EP | 1 048 872 B1 | 11/2000 |
| GB | 1 267 280 | 3/1972 |
| JP | 11-257386 A | 9/1999 |
| JP | 2001-12520 A | 1/2001 |

OTHER PUBLICATIONS

International Search Report dated May 8, 2009 with English translation (four (4) pages).

Chinese Office Action dated Apr. 2, 2013 (three (3) pages).

* cited by examiner

BRAKE DISC HAVING RIBS ARRANGED BETWEEN TWO FRICTION RINGS

CROSS-REFERENCE TO RELATED APPLICATIONS

This application is a continuation of PCT International Application No. PCT/EP2009/000965, filed Feb. 12, 2009, which claims priority under 35 U.S.C. §119 from German Patent Application No. DE 10 2008 013 871.1, filed Mar. 12, 2008, the entire disclosures of which are herein expressly incorporated by reference.

BACKGROUND AND SUMMARY OF THE INVENTION

The invention relates to a brake disc having ribs, which ribs are arranged between two friction rings, extend essentially in the radial direction and bound air cooling ducts by way of their side walls extending essentially perpendicular with respect to the surface of the friction rings. With respect to the technical background, reference is made, for example, to European Patent Document EP 1 048 872 B1 and also to German Patent Document DE 195 37 392 A1.

On the one hand, the cooling or the removal of the heat generated during a braking operation represents a significant challenge on brake discs, particularly on double-walled brake disc. For this purpose, a plurality of embodiments are known in which advantageously extending cooling air ducts between the two friction rings of a double-wall brake disc are formed or bounded by means of ribs, ribs, or the like. These ribs with their side walls bounding the cooling air ducts normally stand perpendicularly on the surface of the friction rings, as also illustrated in the above-mentioned European Patent Document EP 1 048 872 B1; furthermore, it is known to arrange the ribs in a framework-type manner inclined at an angle, for example, by an order of 45° with respect to the surfaces of the friction rings; compare, for example, German Patent Document 195 37 392 A1 also mentioned above.

Another problem may relate to vibrations of the rotating brake disc, particularly when, as a result of these vibrations, other components at least partially coming in contact with the brake disc are, in turn, stimulated to carry out vibrations which may then cause undesirable noise. The two above-mentioned prior art references also describe such noise and vibration problems. In this case, it is suggested in European Patent Document EP 1 048 872 B1 that the vibratory "brake disc" system or its natural frequency profile be detuned such that several slots extending in the radial direction are placed in a friction ring. In German Patent Document DE 195 37 392 A1, the ribs arranged in an inclined fashion in a framework-type manner are reinforced in the tangential direction.

It is an object of the invention to provide an effective measure for a vibration-related modification of the vibratory "brake disc" system for a brake disc having ribs arranged between two friction rings and extending essentially in the radial direction and bounding air cooling ducts by their side walls, which brake disc has basically been successful with respect to cooling problems. It must be possible to avoid with this measure the disadvantage of a mechanical weakening of the brake disc that is contained in the above-mentioned European Patent Document EP 1 048 872 B1, which occurs in this known state of the art because of the slots in the friction ring suggested there.

This and other objects are achieved by a brake disc having ribs arranged between two friction rings and extending essentially in the radial direction and bounding air cooling ducts by their side walls which stand essentially perpendicular with respect to the surface of the friction rings. At least one of the side walls of one, two, three or five ribs is inclined with respect to the perpendicularly standing ribs. For purposes herein, the term "ribs" is used generally to mean ribs, fins, slats, dividers, etc.

Advantageous further developments of the invention are described herein.

In order to achieve the desired goal of avoiding noise generating vibrations of a brake disc, particularly squealing noise, it was disclosed that only a relatively small system modification could achieve such a result. The slight vibration-related modification is achieved when only one or a few of the ribs have at least one inclined side wall, whereby, when the thickness of the rib (measured perpendicularly to the side walls) is not reduced, the rigidity of the "brake disc" system is significantly increased. This increase in rigidity can already be determined when only one or a few ribs are either inclined themselves—which means that their two side walls stand mutually parallel diagonally with respect to the surface of the friction rings and not perpendicularly on the surface of the friction rings—or when only one of the two side walls of one or a few ribs are inclined with respect to the adjacent perpendicularly standing ribs. In this case, the rib is inclined on one side.

Furthermore, it was described that better results are achieved by using the number of ribs disclosed here, i.e., one, two, three or five rib(s) inclined with respect to the plurality of perpendicular (with respect to the friction rings) ribs, or of ribs having at least one inclined side wall, on brake discs for passenger cars, which therefore have dimensions of a defined order of magnitude, and a total number of ribs also of a defined order of magnitude (in the range of from 40 to 60 ribs). In contrast, the use of four or six inclined ribs does not generate sufficient modification of the vibratory "brake disc" system either in the case of an essentially regular distribution over the surface of the friction rings, or in the case of their significant non-uniform distribution, unacceptably high imbalances are generated in the brake disc which can no longer easily be compensated.

Advantageously, a brake disc according to the invention having a few inclined ribs or having a few ribs with at least one inclined side wall is distinguished by lower weight and lower manufacturing costs from the above-mentioned state of the art according to which all ribs are arranged in a framework-type inclined manner (compare German Patent Document DE 195 37 392 A1).

In the case of at least one of the ribs having at least one inclined side wall, the rib thickness measured in the direction perpendicular to the side wall may differ from the thickness of the perpendicularly standing ribs, in which case the inclined rib or the inclined ribs may either be constructed to be thicker than the perpendicularly standing ribs—which results in a more intensive vibration-related modification of the vibratory "brake disc" system—or may be constructed to be slightly thinner than the perpendicularly standing ribs. In the last-mentioned case, the design can be such that the mass of an inclined rib, whose surface is naturally larger than that of a perpendicular rib, is essentially equal to the mass of the perpendicular rib, so that no significant imbalance of the brake disc is caused as a result of one inclined rib of this type or of a few of such inclined ribs.

The vibratory "brake disc" system can be modified particularly effectively with respect to conceivable stimulations of vibrations if, in the case of two or three or five ribs, of which at least one side wall is inclined with respect to the perpendicularly standing ribs, the angles enclosed between these inclined ribs (with an inclined wide wall) are not all the same. The corresponding inclined ribs are therefore arranged to be irregularly distributed over the surface of the friction rings. An imbalance resulting from such a non-uniform distribution of ribs with an inclined side wall can essentially be eliminated by the accumulation of material, particularly on appropriately selected perpendicularly standing ribs, which preferably are situated opposite the inclined ribs with respect to the brake disc center.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
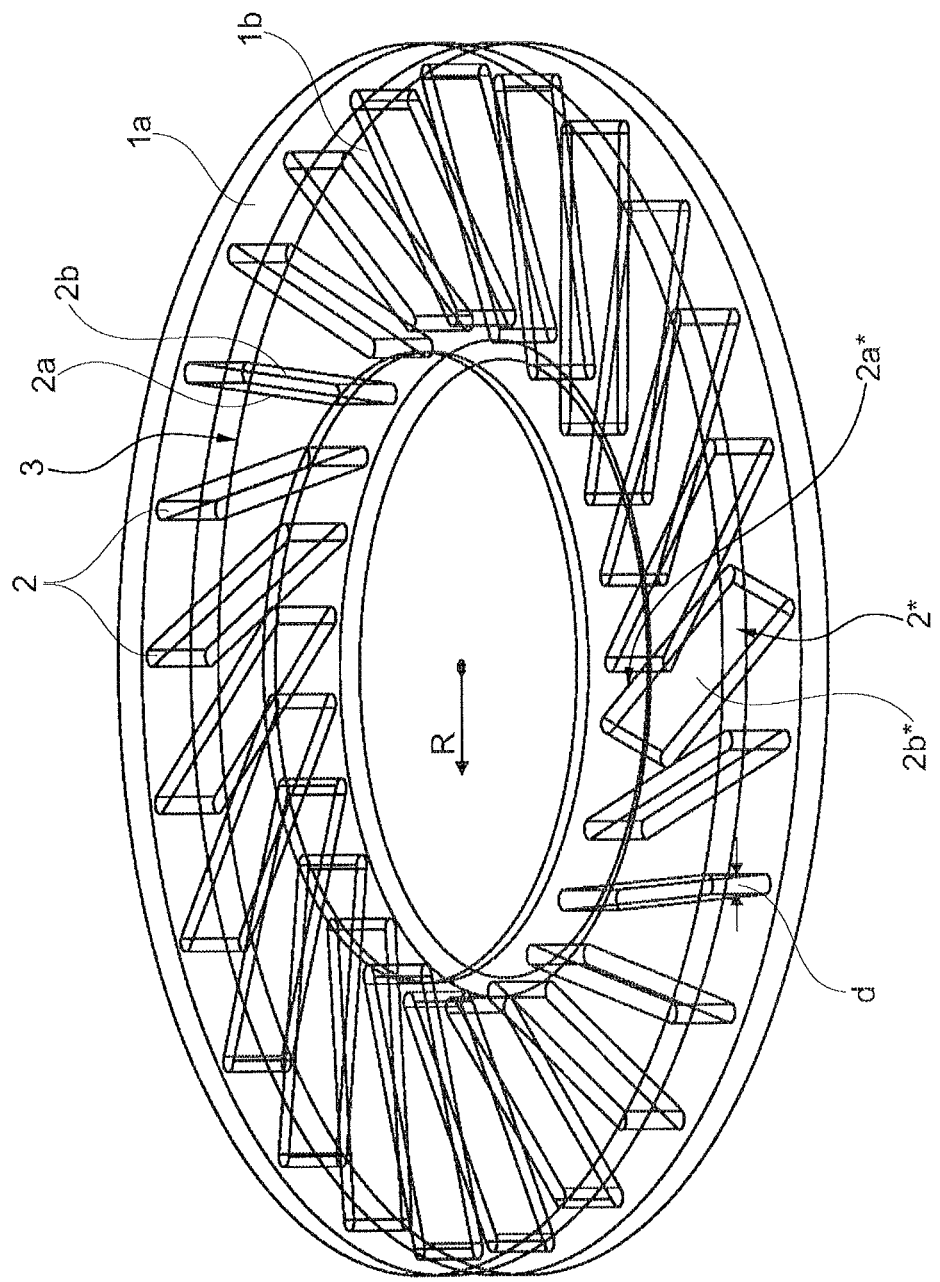
FIG. 1 illustrates an example of the brake disc according to the invention in a quasi-spatial, very simplified representation, the individual components of this brake disc being shown in a transparent manner which deviates from reality.

Referring to FIG. 1, reference number 1a indicates the upper friction ring and reference number 1b indicates the lower friction ring of an internally ventilated brake disc of a motor vehicle. In a manner that is conventional in principle, a plurality of ribs 2 are provided between these two friction rings 1a, 1b arranged with the same axis of rotation parallel with respect to one another, which ribs 2 extend approximately, or generally in the radial direction R from the interior, i.e., the area facing the axis of rotation, to the exterior, i.e., the outer circumference of the brake disc. In each case, two mutually respective ribs 2 bound a cooling air duct 3 extending between the two friction rings 1a, 1b.

Figure 2A:
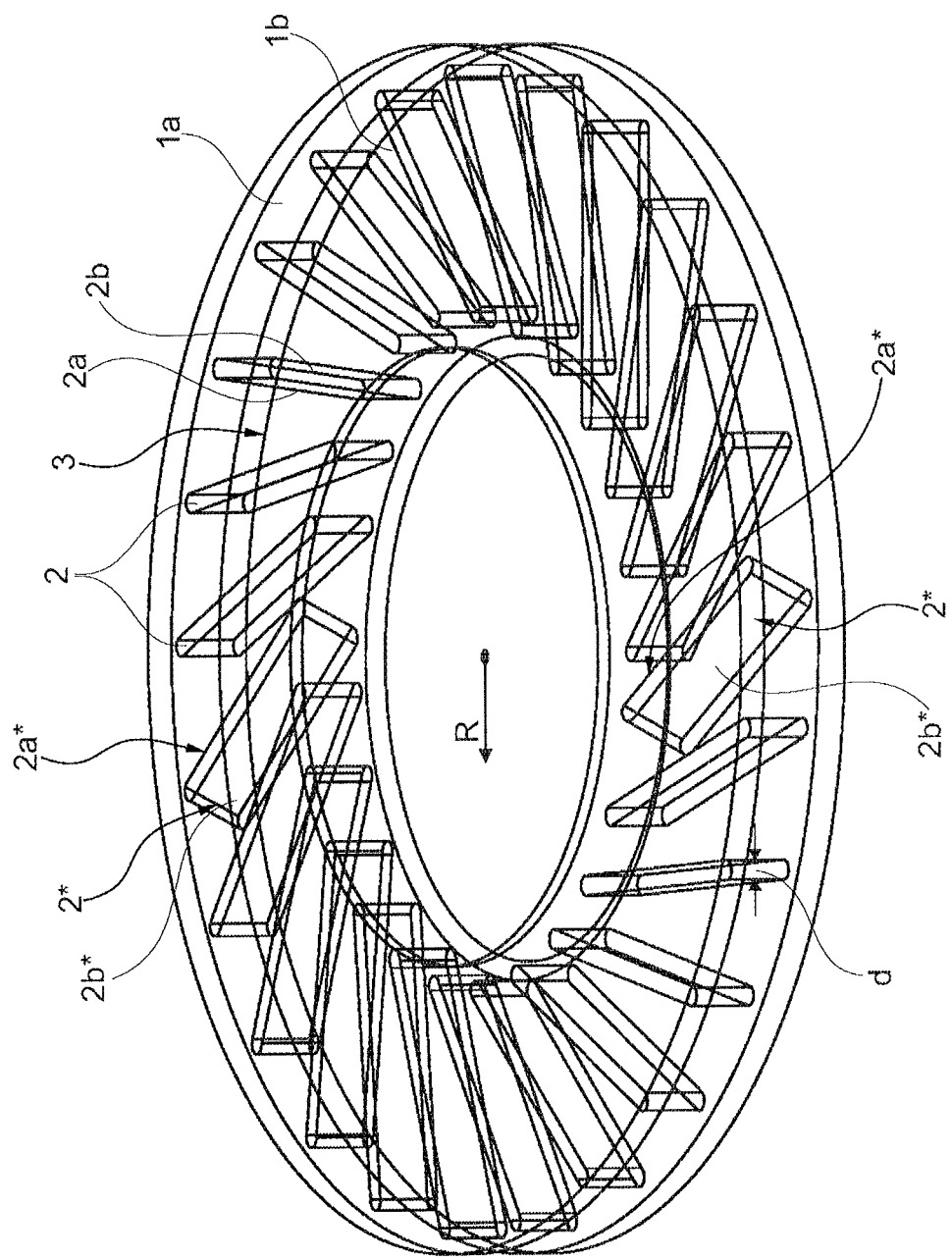
FIGS. 2a, 2b and 2c illustrate examples of disk brakes in the manner of FIG. 1 with two, three and five inclined ribs, respectively.
Figure 2B:
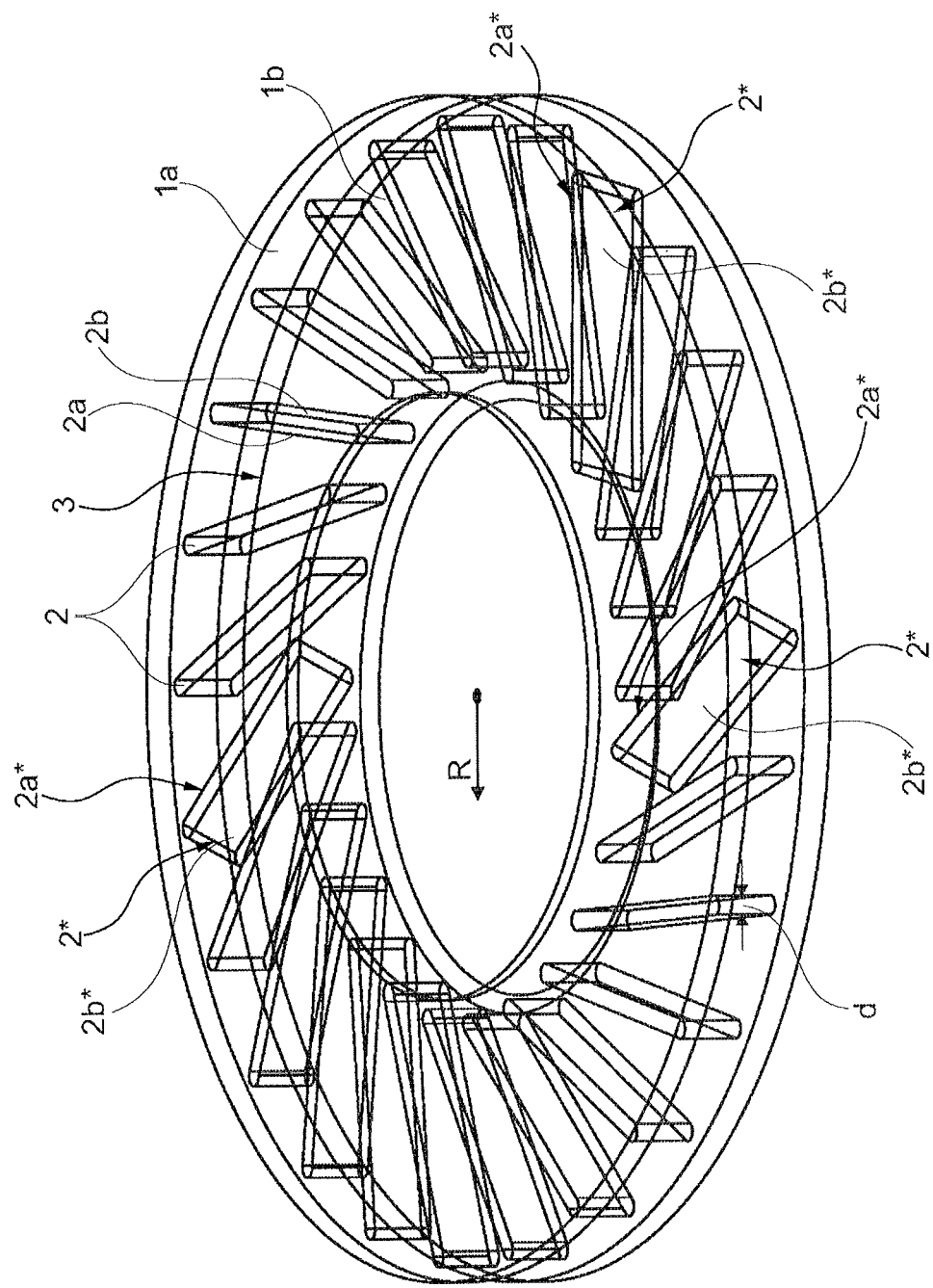
Figure 2C:
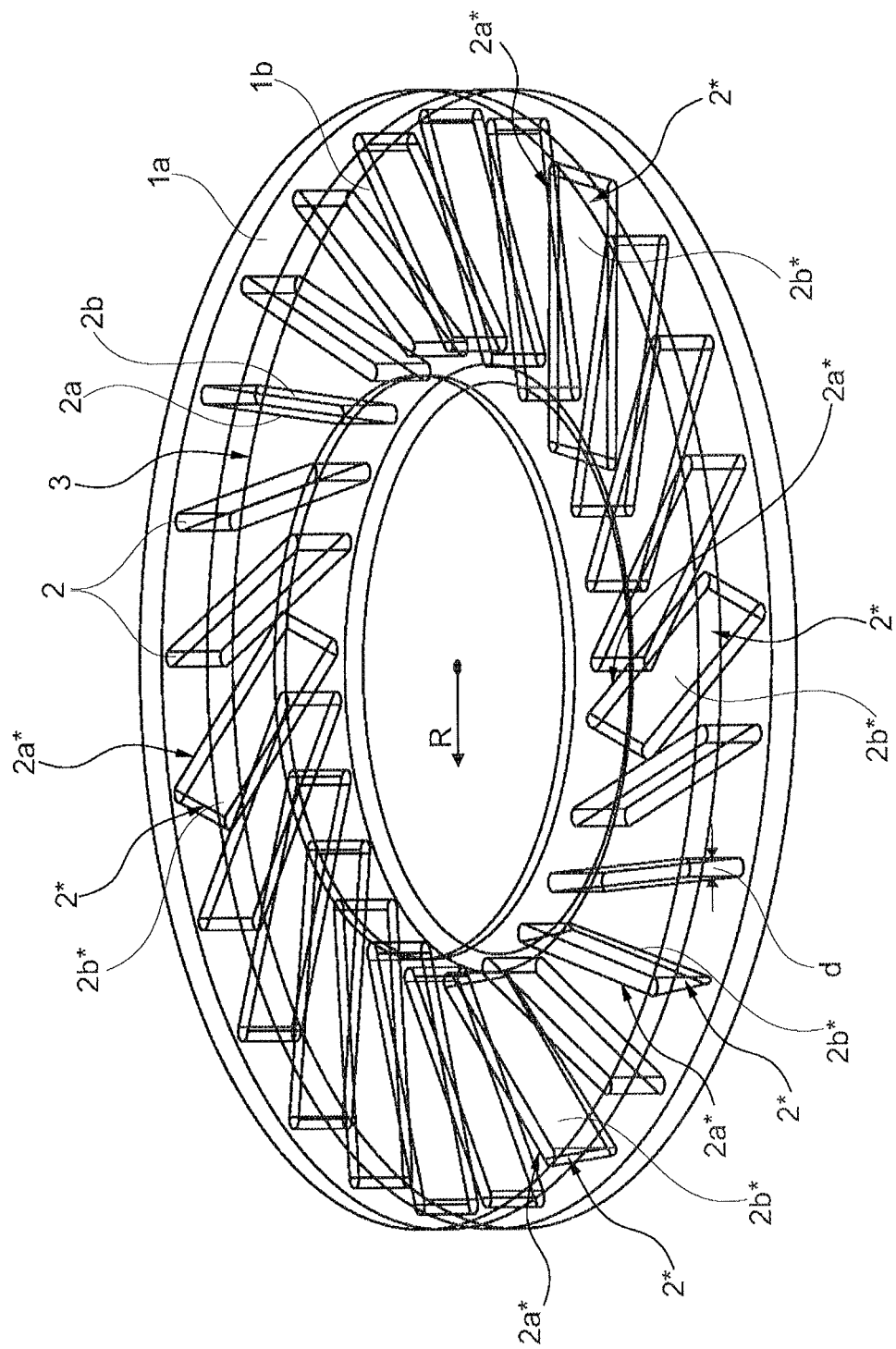

In the FIG. 1 embodiment, one of the ribs 2, specifically the rib designated with reference number 2* is arranged slightly differently than the remaining ribs 2. Specifically, while all ribs 2, with the exception of rib 2*, have side walls 2a, 2b standing essentially perpendicular with respect to the surfaces of the frictions rings 1a, 1b, the two side walls 2a*, 2b* of rib 2* enclose an angle that differs significantly from 90° with respect to the surfaces of the friction rings 1a, 1b and are therefore arranged in an inclined manner with respect to the other ribs 2. However, this inclined rib 2* having the inclined side walls 2a*, 2b* is connected with the friction rings 1a and 1b respectively in the same manner as the other ribs 2. FIGS. 2a, 2b and 2c similarly illustrate embodiments having two, three and five inclined ribs 2*, respectively, with FIG. 2c showing ribs with both one inclined side wall and two inclined side walls.

The additional modifications indicated before the description of the figure are not shown in this figure. For the purpose of clarification, the thickness d of a rib 2 indicated in the preceding explanations is also shown. It should, however, be pointed out that many design details in accordance with the invention deviating from the above explanations would be well within the skill in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc for a vehicle, comprising:
   first and second friction rings;
   a plurality of ribs arranged between the first and second friction rings and extending essentially in a radial direction forming air cooling ducts bounded by side walls of the plurality of ribs,
   wherein at least a majority of said plurality of ribs have both side walls arranged substantially perpendicular with respect to friction surfaces of the first and second friction rings,
   wherein exactly one, two, three or five of said plurality of ribs have at least one side wall inclined with respect to the perpendicular ribs, and
   wherein for at least one of the ribs having at least one inclined side wall, a rib thickness measured in a direction perpendicular with respect to the side wall differs from a thickness of the perpendicular ribs such that a rib mass of each rib of said at least one rib having at least one inclined side wall is equal to a mass of each of the perpendicular ribs.

2. The brake disc according to claim 1, wherein when two, three or five ribs of said one, two, three or five of said plurality of ribs having at least one side wall is inclined with respect to the perpendicular ribs are present, angles enclosed between the ribs having the inclined side wall are not all the same.

3. The brake disc according to claim 1, wherein both side walls of said one, two, three or five ribs are inclined with respect to the perpendicular ribs.

4. The brake disc according to claim 3, wherein a thickness measured in a direction perpendicular with respect to the inclined side walls differs from a thickness of the perpendicular ribs.

* * * * *